United States Patent
Baize

(10) Patent No.: US 10,098,324 B2
(45) Date of Patent: Oct. 16, 2018

(54) HERD CONTROL METHOD AND SYSTEM

(71) Applicant: Jonathan O. Baize, Marfa, TX (US)

(72) Inventor: Jonathan O. Baize, Marfa, TX (US)

(*) Notice: Subject to any disclaimer, the term of this patent is extended or adjusted under 35 U.S.C. 154(b) by 400 days.

(21) Appl. No.: 15/095,807

(22) Filed: Apr. 11, 2016

(65) Prior Publication Data
US 2016/0295833 A1    Oct. 13, 2016

Related U.S. Application Data

(60) Provisional application No. 62/145,470, filed on Apr. 9, 2015.

(51) Int. Cl.
| | | |
|---|---|---|
| *A01K 15/00* | (2006.01) | |
| *A01K 11/00* | (2006.01) | |
| *A01K 3/00* | (2006.01) | |
| *A01K 15/02* | (2006.01) | |

(52) U.S. Cl.
CPC ........... *A01K 15/023* (2013.01); *A01K 3/00* (2013.01); *A01K 11/008* (2013.01); *A01K 15/029* (2013.01)

(58) Field of Classification Search
CPC .. A01K 11/008; A01K 15/023; A01K 15/021; H04W 4/02; H04W 4/023; H04W 4/80; G06Q 30/0261; G08B 13/1427; G08B 21/0225

See application file for complete search history.

(56) References Cited

U.S. PATENT DOCUMENTS

| | | |
|---|---|---|
| 5,067,441 A | 11/1991 | Weinstein |
| 5,121,711 A | 6/1992 | Aine |
| 5,307,759 A | 5/1994 | Rose |
| 5,408,956 A | 4/1995 | Quigley |
| 5,533,470 A | 7/1996 | Rose |
| 5,636,597 A | 6/1997 | Van Curen et al. |
| 5,642,690 A | 7/1997 | Calabrese et al. |
| 5,799,618 A | 9/1998 | Van Curen et al. |
| 5,844,489 A | 12/1998 | Yamall, Jr. et al. |
| 5,868,100 A | 2/1999 | Marsh |
| 6,232,880 B1 | 5/2001 | Anderson et al. |
| 6,581,546 B1 | 6/2003 | Dalland et al. |
| 6,700,492 B2 | 3/2004 | Touchton et al. |
| 7,196,628 B2 | 3/2007 | Hixson |
| 7,843,350 B2 | 11/2010 | Geissler et al. |
| 7,918,185 B2 | 4/2011 | Araki et al. |
| 7,937,042 B2 | 5/2011 | Light et al. |

(Continued)

*Primary Examiner* — Fekadeselassie Girma
(74) *Attorney, Agent, or Firm* — Kammer Browning PLLC

(57) ABSTRACT

Herd control methods and systems are described that can achieve great benefits over conventional methods when applied to animal and range management. The methods allow much greater animal density than is possible by other means of intensive grazing. A herd can be turned out in a large pasture or unfenced rangeland without dispersal. The herd constantly moves to find new forage and water without the negative consequences of uncontrolled grazing, and fencing can be reduced or eliminated. The methods use devices attached to some or all of a plurality of animals to replicate a herdsman rather than a fence. These herding devices are equipped with components for measuring the distance to neighboring devices. A stimulation component actuated by the processor applies a stimulus, such as a sound or an electric shock, if the animal is too far from the herd.

20 Claims, 9 Drawing Sheets

(56) References Cited

U.S. PATENT DOCUMENTS

| | | | |
|---|---|---|---|
| 8,942,693 B2* | 1/2015 | Johnson | H04W 4/02 455/418 |
| 2005/0200487 A1* | 9/2005 | O'Donnell | A62B 99/00 340/573.1 |
| 2006/0133338 A1* | 6/2006 | Reznik | H04L 27/3477 370/338 |
| 2006/0180093 A1* | 8/2006 | Cross | A01K 11/008 119/720 |
| 2007/0044732 A1* | 3/2007 | Araki | A01K 11/008 119/721 |
| 2008/0035072 A1 | 2/2008 | Lee | |
| 2008/0173255 A1* | 7/2008 | Mainini | A01K 15/021 119/720 |
| 2009/0157547 A1* | 6/2009 | Ruckart | G06Q 20/12 705/44 |
| 2011/0234410 A1 | 9/2011 | Groh et al. | |
| 2012/0111286 A1* | 5/2012 | Lee | A01K 11/008 119/719 |
| 2012/0201277 A1 | 8/2012 | Tanner et al. | |
| 2013/0012220 A1* | 1/2013 | Waris | H04W 4/38 455/450 |
| 2013/0340305 A1 | 12/2013 | Mobley | |
| 2014/0145079 A1* | 5/2014 | Omino | G01T 1/02 250/336.1 |
| 2014/0282877 A1* | 9/2014 | Mahaffey | H04L 63/0853 726/3 |
| 2014/0345539 A1* | 11/2014 | Corke | A01K 29/005 119/721 |

\* cited by examiner

HERD CONTROL METHOD AND SYSTEM

CROSS REFERENCES TO RELATED APPLICATIONS

This application claims the benefit under Title 35 United States Code § 119(e) of U.S. Provisional Patent Application Ser. No. 62/145,470; Filed: Apr. 9, 2015; the full disclosure of which is incorporated herein by reference.

BACKGROUND OF THE INVENTION

1. Field of the Invention

The present invention relates generally to animal and grazing management. The present invention relates more specifically to methods and systems for forming and controlling a herd of grazing animals.

2. Description of the Related Art

Grazing animals have a dramatic impact on rangeland ecosystems. These ecosystems are designed to flourish in conjunction with animals which control vegetation, promote water absorption, and replenish important nutrients. Rangeland has been demonstrated to deteriorate when grazing animals are removed. In the past, non-domesticated animals such as bison in North America formed large herds which continually moved to fresh ground as resources became depleted. Domesticated livestock were typically managed by a herdsman who guided animals to forgeable locations. When wire became practical to manufacture on a large scale, herdsmen were able to build fences to enclose pastures of manageable size. Livestock could then be turned out for grazing without constant supervision. These fences continue to make up one of the primary means of livestock management today. Unfortunately, physical fences have severe drawbacks. Besides the high cost and resources required in building fences, livestock tend to spread out over the entire enclosed area. Instead of grazing in a herd, individual animals graze and travel to water at will. Because the animals do not usually graze in their natural herd configuration, the rangeland ecosystem does not benefit as much from their presence. For example, plants tend to be selectively grazed causing less desirable forage to flourish.

In an attempt to maximize the positive effects of grazing animals, portable fences have been used to limit the location in which animals can graze. These are usually electrically energized fences that contain animals in a small area for a short period of time. In this way animals can be moved systematically across the rangeland with more uniform grazing effects. This method of rotational grazing has been used with some success, but is often impractical to use on large areas with limited forage density. It can be difficult to build and move the long lengths of fence needed. Also, the high density fencing can be unsightly. Not only do electric fences inhibit the natural movement and behavior of some types of wildlife, some species damage the fences and render them ineffective. Certain species of deer, for example, cause destruction on a large scale. Hence, portable fences are not widely used in many rangeland ecosystems that could benefit from rotational grazing management.

There have been attempts to use portable technology to simulate fences by applying stimulation to animals which cross a geographical boundary. These devices typically use GPS (Global Positioning System) technology (Anderson et al., U.S. Pat. No. 6,232,880) or ground based transponders (Quigley, U.S. Pat. No. 5,408,956) to determine the geographic or relative position of the animal. They can apply an audio signal, electric shock, or vibration to the animal if it attempts to cross an invisible "fence." These devices have the disadvantage of being relatively complex and expensive. Even if the cost is reduced, the animals are easily confused and stressed as they attempt to avoid the stimuli. The "fence" is not visible to the animals, and if it moves for rotational grazing purposes they must continually relearn where the boundary is and how to avoid it. The boundary itself is arbitrary from the animal's perspective which decreases effectiveness. Constant monitoring of location by GPS to keep an animal within a designated area is somewhat power intensive, while ground based transponders are limited in range and can only be used effectively for small areas. Varying propagation characteristics of a ground transponder's signal have also been shown to cause unreliability. Corke (U.S. Pat. App. Publ. No. 20130333631) describes a system for animal control based on relative proximity and movement, particularly for the purpose of limiting negative animal interaction such as fighting. However, this system has the disadvantage of having to calculate relative movement.

Other concepts for animal control have been described that utilize stimuli. Most of these devices, however, are intended for promoting desired behavior in pets and other animals. Some are activated manually by the handler for training purposes, while others are activated based on undesired behavior such as barking or fighting.

SUMMARY OF THE INVENTION

Because of the problems associated with fences of any kind, physical or simulated, a new approach is needed. The following methods and systems are an improvement over physical or simulated fences. The methods use devices attached to some or all of a plurality of animals to replicate a herdsman rather than a fence. The systems can be configured to keep animals together, and can also control the movement of the resulting herd. These herding devices are equipped with components for measuring the distance to neighboring devices. Simple radio frequency (RF) transceivers can be used for this purpose as well as for general communication between devices. A circuit or processor uses a signal filter to compress distance measurements from multiple peers into a testable variable representing the general proximity of the device to its peers. An electronic variable comparator circuit or routine compares the variable with a user defined threshold value to determine if stimulation is needed. A stimulation component actuated by the processor applies a stimulus, such as a sound or an electric shock, if the animal is too far from the herd. Unlike other methods that apply stimuli as animals approach a geographic boundary, the proposed methods allow animals to easily learn how to avoid stimulation since the natural gregarious instinct is simply reinforced to maintain herd integrity.

The animal density of the herd can be adjusted by changing the predetermined distance and the predetermined number of animals in proximity to each individual animal. The herd constantly moves to find forage and water without the negative consequences of dispersal even within a large pasture or unfenced rangeland. A cellular communications module or other communication link in conjunction with the herding devices and a user application can be utilized for user monitoring and control. A GPS module can be attached to at least one of the animals to provide the geographic location of the herd. The system can analyze the amount of time the herd spends in a given area, and calculate grazing pressure by location. The grazing pressure history in conjunction with the current location of the herd can be utilized to determine a preferred herd movement direction to avoid over or under-grazing particular areas. A compass module on at least some of the herding devices can determine the directional orientations of the animals to which they are attached, while the previously mentioned stimulation means can be utilized to enforce preferred orientations. By controlling individual animal orientations, the direction of herd movement can be controlled for animal, range and management benefits.

DETAILED DESCRIPTION OF THE PREFERRED EMBODIMENTS

Benefits for the Rangeland—

Many profound benefits are achieved for the rangeland by utilizing this method to maintain grazing animals as a herd. Pastures are grazed more uniformly since the animals are compelled to forage close together rather than spreading out in search of especially desirable vegetation. Because they are not singled out for consumption, desirable vegetation is given more opportunity to grow and reproduce. Brush and small woody plants are broken by the compact herd and are subjected to greater browsing pressure. Bare ground is loosened by intensified hoof action promoting the absorption of water and the germination of seeds. Single file trails are unused, resulting in reduced soil erosion. Soil fertilization is more uniform, and other animals which utilize the animal droppings, such as dung beetles, follow the herd in mass and bury important nutrients in the soil as the herd moves.

Benefits for Grazing Animals—

In addition to the benefits for the rangeland, the grazing animals are benefited as well. Less energy is expended in movement since each animal travels a shorter distance with the herd than they would as individuals. Winter time energy expenditure is reduced since animals stay warmer in close proximity to each other. Fewer bulls are needed and conception rates are improved because bulls remain with the cows during breeding season. Species that control parasites such as cow birds follow the herd and promote animal health. The life cycle of some parasites is disrupted since animals will not continually frequent the same grazing areas, and predators are less likely to single out weaker individuals.

Management Benefit—

In addition to these positive effects for the animals and the rangeland, management is easier and less expensive. Checking the wellbeing of the animals is simpler because they can all be found in close proximity to each other. Animals become gentler since they can be subjected to more exposure to their handler. The need for gathering the entire pasture for branding, weaning, etc. is reduced. Fewer herdsmen are required to gather and move the herd. Mavericks are easier to capture since they remain with the others. Animals can be more easily directed to un-grazed areas to promote optimal grazing, while the need for boundary fence maintenance is reduced since a herd is less likely to escape through small holes than individual animals.

Herding Device Assembly—

Figure 3A:
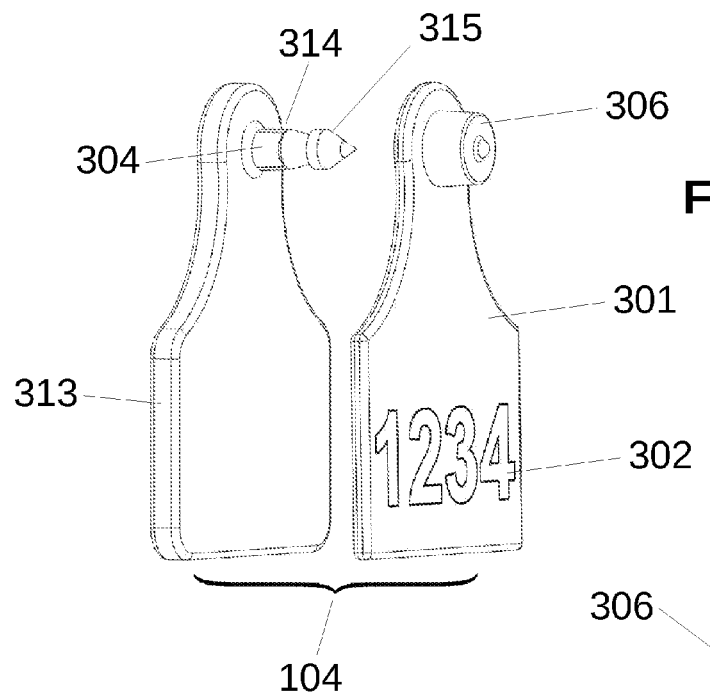
FIGS. 3A-3C show perspective views of one embodiment of the herding device constructed as a tag assembly.
Figure 3B:
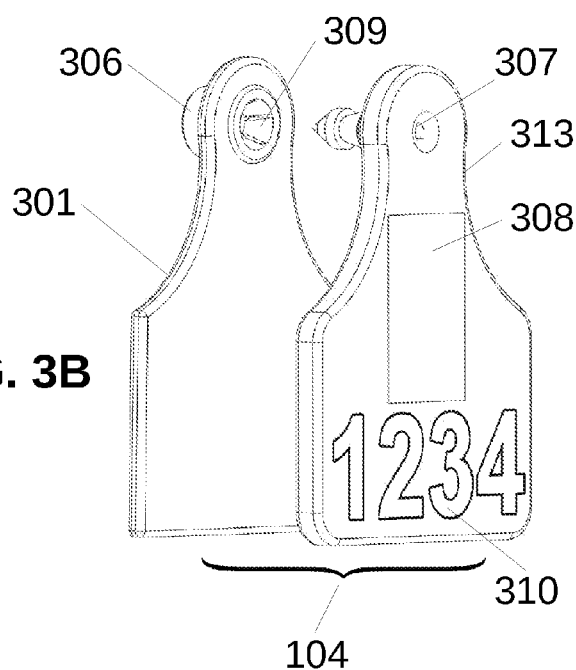
Figure 3C:
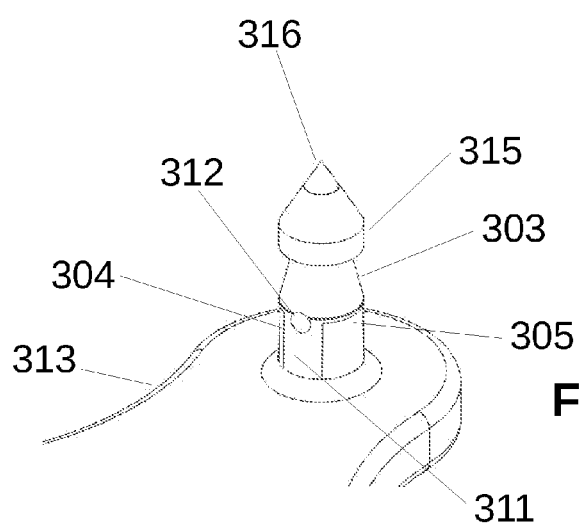

The proposed method and system utilizes herding devices attached to a plurality of animals. These herding devices could be housed in ear tags, collars, nose rings, etc. The embodiment of the herding device (104) illustrated in FIGS. 3A-3C is an ear tag assembly utilized to enclose the electronics and provide attachment to the animal. This ear tag assembly is comprised of an active tag (313) and an opposing passive tag (301). When installed in the animal's ear, the active tag (313) can be positioned behind the ear in order to receive maximum sunlight exposure. The passive tag (301) can display alpha numeric, bar code, or other visual identification information (302) visible from in front of the animal's ear. The passive tag (301) can also provide a locking receptacle (306) and flexible locking flanges (309) for securing the locking head (315) of the active tag (313) once the assembly is attached to the animal's ear. The main portion of the passive tag (301) can be constructed of flexible material while the locking receptacle (306) and flanges (309) preferably utilize a harder material for durability and secure latching characteristics.

Active Tag Construction—

The active tag (313) of this embodiment houses the electronics of the device. The active tag (313) can include a pin (314) that passes through the animal's ear similar to that of standard identification ear tags. The tip (316) of the pin (314) could be constructed of hard plastic or metal to aid penetration of the animal's ear during installation, while the main body of the tag could be constructed of flexible material around the electronics. The pin could also have a hollow channel (307) from the back of the tag to the tip (316) to allow application using industry standard tagging equipment. In order to improve electrical contact between the metallic stimulation electrodes (304 & 305) and the animal's ear tissue, the pin (314) can return to the diameter of the locking head (315) after the locking neck (303). The stimulation electrodes (304 & 305) can be separated by an insulating gap (311) as shown in FIG. 3C. The pin (314) could have an audio channel and exit port (312) to direct the signal from an audio transducer into the animal's ear. The active tag could also have visual identification information (310) and an exposed solar panel (308) for energy collection.

Active Tag Electronics—

Figure 4A:
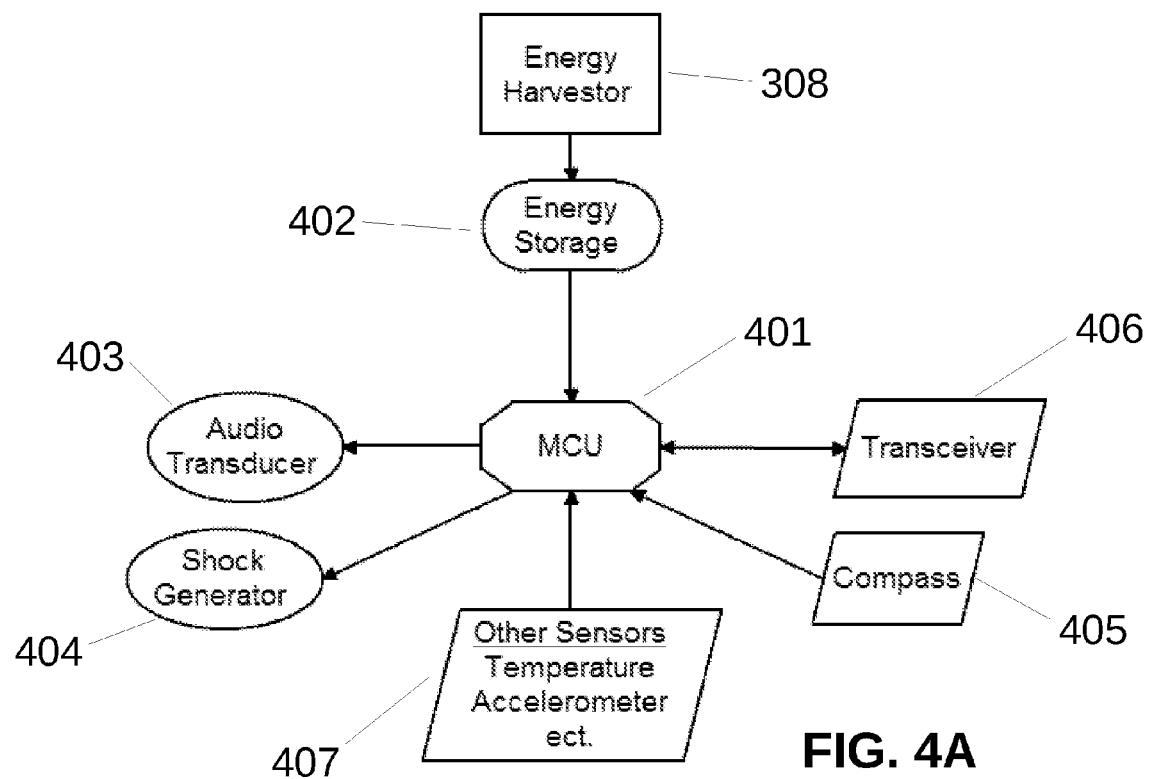
FIGS. 4A & 4B show the electronics and interworking of the components of the embodiment of the herding device illustrated in FIGS. 3A-3C.
Figure 4B:
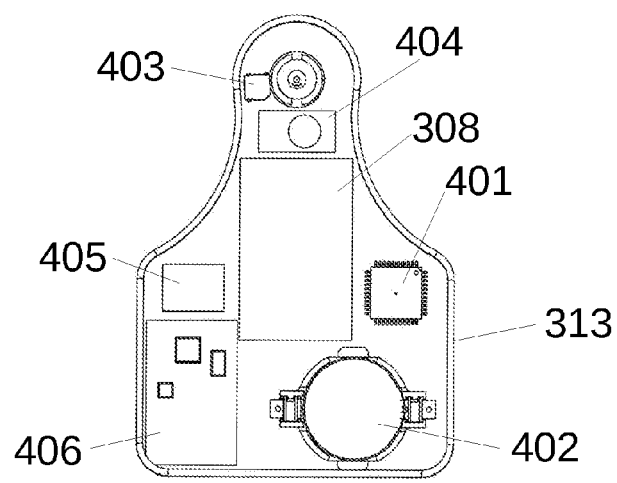

The active tag's electronics are shown in FIGS. 4A & 4B. In the illustrated embodiment they are embedded in the flexible tag material. They include a Microcontroller unit (MCU) or logic circuit (401). Among other processing tasks, the MCU (401) provides the means for calculating the distance from other tags based on the Received Signal Strength (RSS) of report signals detected by the RF transceiver (406). The transceiver (406) is also used for general communication between devices, and for transmitting its own report signal. The electronics can be powered by a battery (402) in conjunction with the solar panel (308). This power system can provide months or years of maintenance free operation. A piezo electric audio transducer (403) can transmit a warning signal when the MCU (401) determines that the target animal is not close enough to a sufficient number of its peers to maintain herd integrity. As previously mentioned, the signal from this transducer can be channeled through the audio channel and exit port (312) in order to allow the animal to clearly hear the warning signal. A voltage multiplier circuit (404) steps up the low voltage from the battery (402) to a level sufficient to serve as an aversive stimulus if the animal ignores the audio warning. The high voltage signal is passed to the stimulation electrodes (304 & 305) which contact the target animal's ear tissue.

The herding device (104) can be outfitted with an electronic compass (405) which would enable the system to direct the herd in desirable directions for grazing or management purposes. When the MCU (401) determines that the animal is not headed in a desirable direction based on the compass (405) signal, an audio warning and or aversive electrical stimuli can be applied. Additional sensors (407) such as temperature sensors and accelerometers can provide additional functionality.

Tracking Device Construction—

Figure 6A:
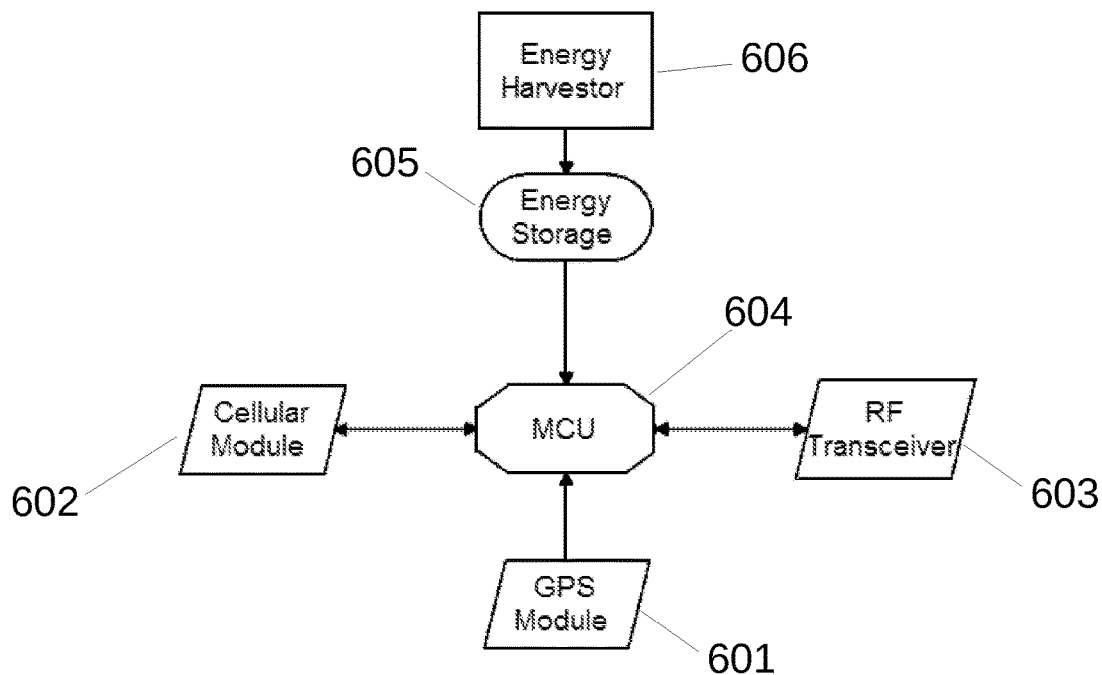
FIGS. 6A & 6B show the electronics and interworking of the components of the embodiment of the tracking device illustrated in FIG. 7A.
Figure 6B:
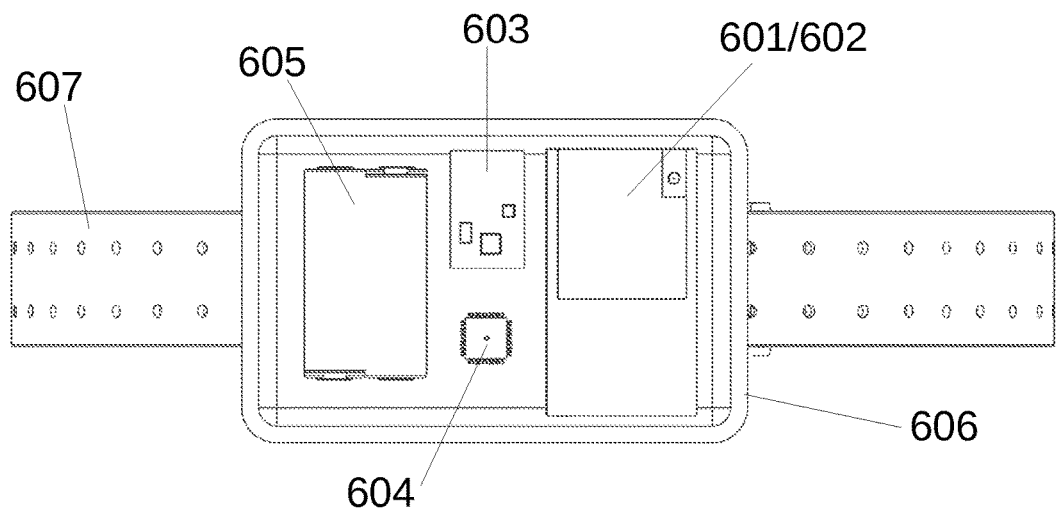
Figure 7A:
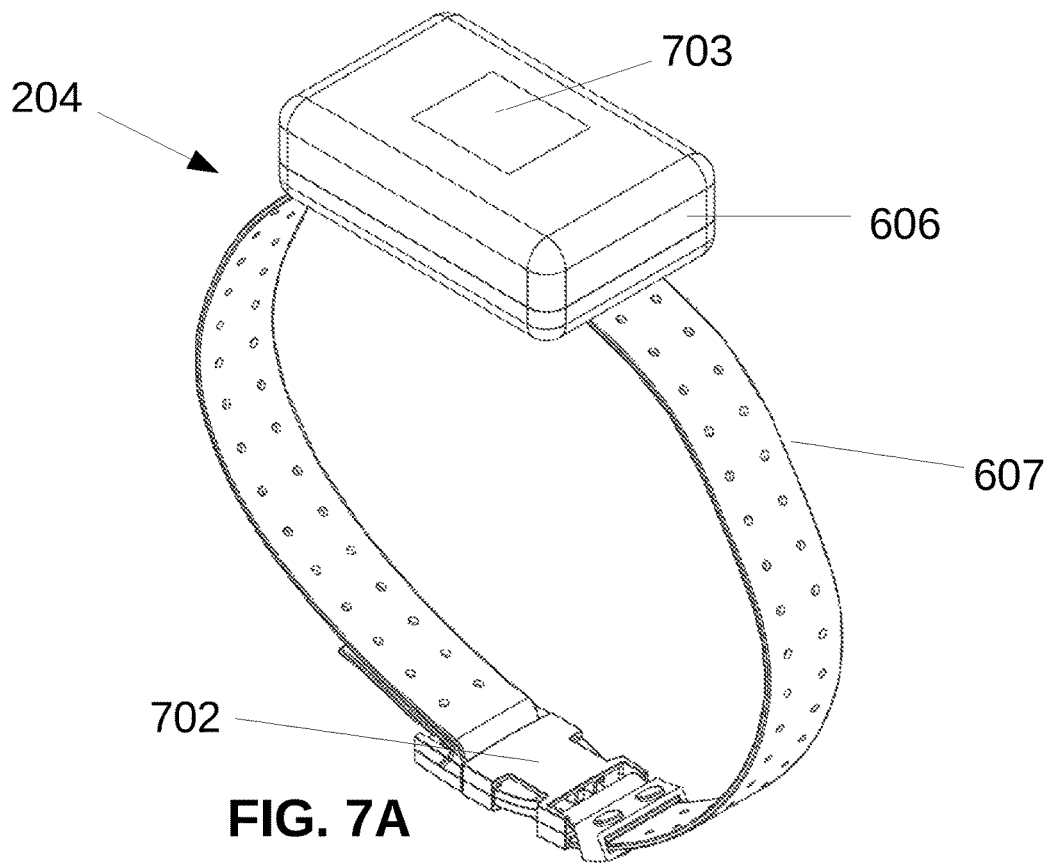
FIGS. 7A & 7B show perspective views of one embodiment of the tracking device constructed as a neck collar assembly, as well as a representative control flow of the system.
Figure 7B:
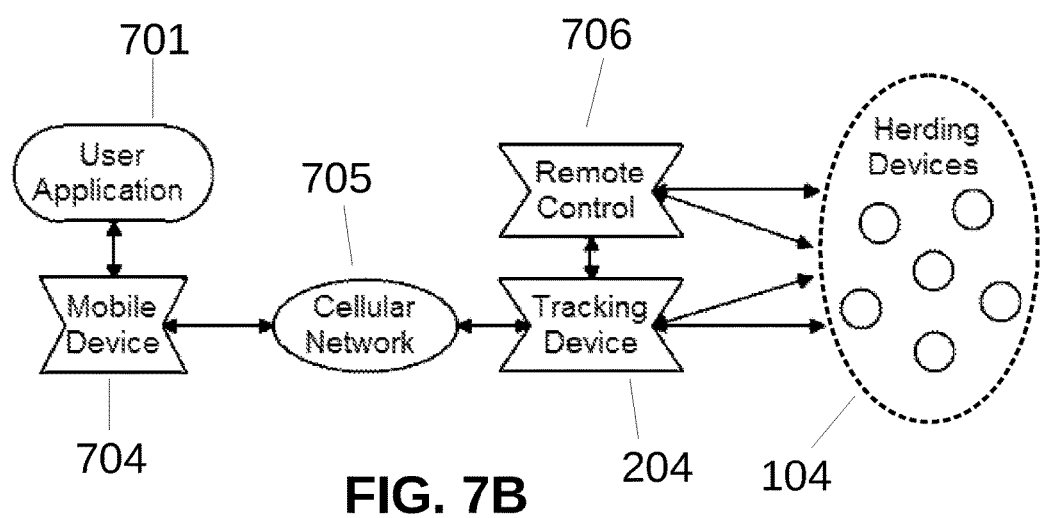

In order to achieve the benefits of herd tracking, at least one Global Positioning System (GPS) Module (601) can be included in the system. For user control and remote communication a cellular radio module (602) can also be included. These modules could be added to at least one of the previously described herding devices (104) or they could be part of a separate tracking device (204). Since one device is sufficient to determine the general location of the herd, one tracking device (204) can be attached to at least one of the plurality of animals. If tracking devices (204) are utilized in conjunction with the distance measuring capability of each of the herding devices (104), the location of each animal within the herd can be determined. The embodiment shown in FIGS. 6B & 7A is comprised of a tracking device electronics enclosure (606) which is attached to the animal with a neck collar (607). The enclosure (606) can be topped with a solar panel (703) for energy collection. A latching means (702) for the collar provides the ability to secure the device to the animal. The collar (607) can be shaped or weighted so that the electronics enclosure (606) remains at the top of the animal's neck.

Tracking Device Electronics—

The tracking device (204) can include the before mentioned GPS/Cellular Module (601/602) for location information and communication purposes. It can also contain an RF transceiver (603) for communication with the herding devices (104) or a short range user remote control device (706). The tracking device can be controlled by a Microcontroller Unit (604) and powered by a rechargeable battery (605) and solar panel (703).

Herding Device Firmware—

Figure 5:
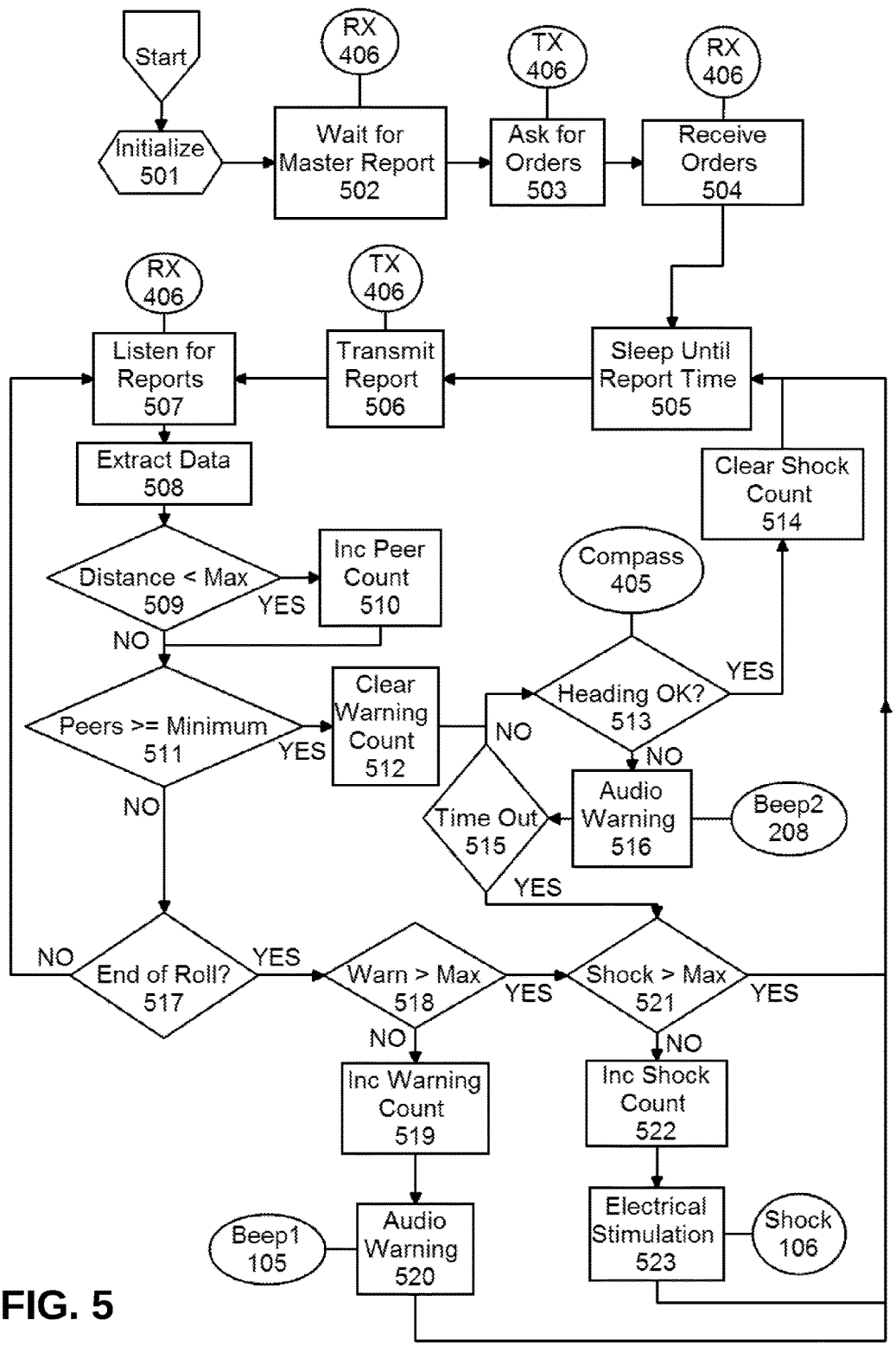
FIG. 5 shows a flowchart of a non-limiting program for the herding device.

The herding devices (104) attached to at least some of a plurality of grazing animals can operate independently to keep the herd together, or in conjunction with a tracking device (204) to control the direction of herd movement. FIG. 5 shows a non-limiting flowchart of the firmware for the herding devices (104). The system of herding (104) and/or tracking devices (204) can choose a master device to coordinate communications and events. The master device can be chosen on the basis of seniority and whether or not the other devices are able to communicate with the chosen master. If the master device is lost or malfunctions, the system can automatically choose a new master. When a device is installed and initialized (501) it will wait for a report from the master device (502) as a signal to request setup information and roll call timing (503). After the device is assigned a role call slot and ordered by the master to commence normal operation (504) it will enter a low power sleep mode (505) until the appropriate time for it to transmit a report. When the appropriate time comes the device will wake up and transmit a report (506). It will then stay awake and listen for reports from other devices (507). The device will extract important information from the received report (508). This information can include the RSS to be used in calculating the distance between the devices.

Maintaining a Herd—

Figure 1:
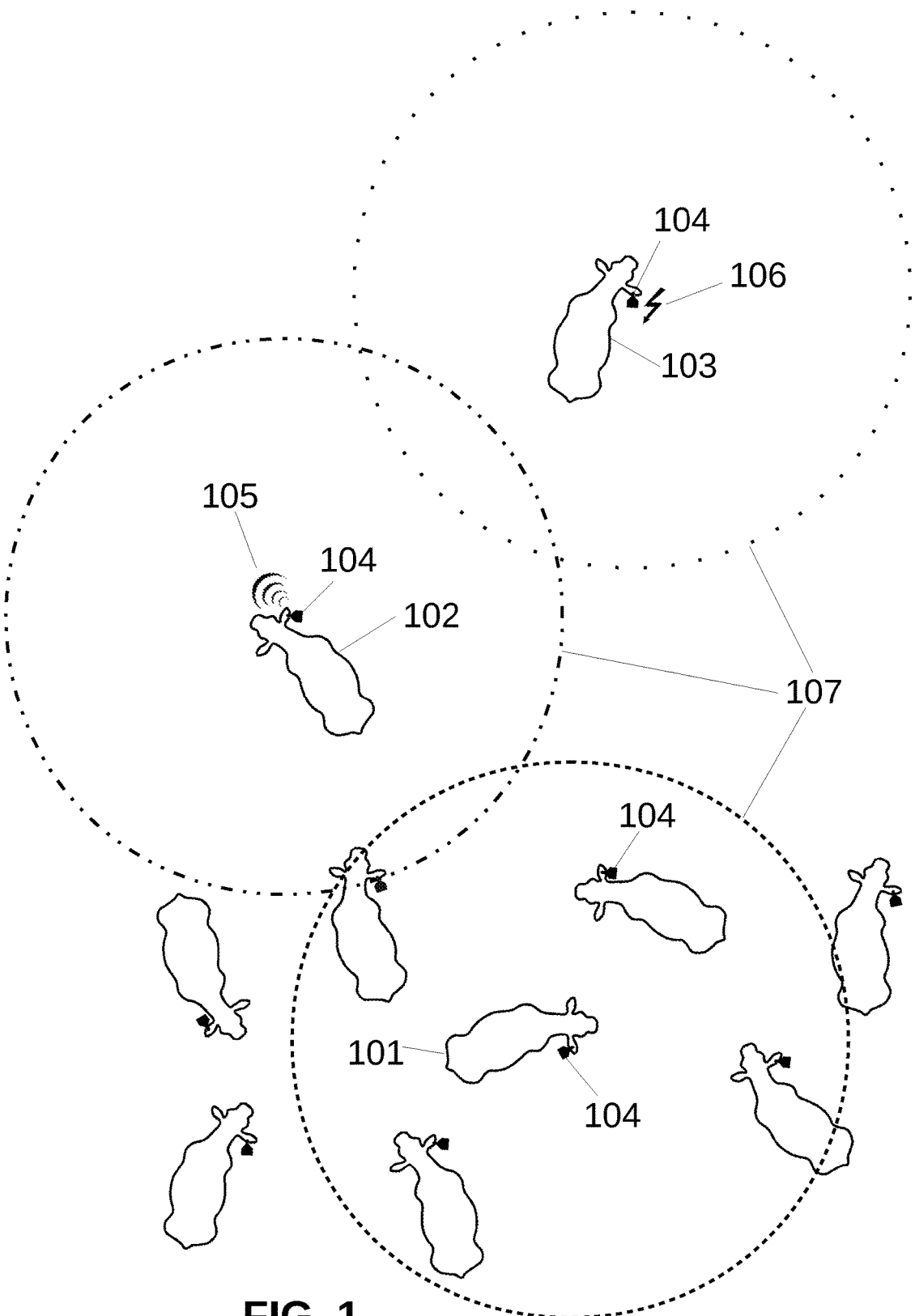
FIG. 1 shows animals in various positions relative to a herd and the function of the herding devices configured to keep the animals together.

If the device determines that the report came from a neighboring device within the maximum distance set by the user (509) it will increment a counter corresponding to the number of nearby peers (510). The device will then continue to listen for the reports of other devices (507). This digital signal filter process will compress the distance measurements from multiple peer devices into a herd proximity variable. This proximity variable can then be compared with the user defined threshold value. If the peer counter reaches the minimum number necessary to indicate appropriate proximity to the herd (511) the device will determine that the target animal does not need stimulation to rejoin the herd. FIG. 1 shows an animal (101) within a herd in close proximity to its peers. In this case the target animal (101) has enough peers within the maximum distance (107) to avoid stimulation. As shown in FIG. 5, if the device does not receive enough reports from peers within the maximum distance it will continue listening until the roll is complete (517). In this case the animal has strayed too far from its peers and must receive stimulation to rejoin the herd. A counter is incremented corresponding to the number of times the animal has received an audio warning (519). At first the stimulation can be an audio warning (520) consisting of a particular sound (105) as a power efficient way to send low stress stimulation to the animal. In FIG. 1 an animal (102) has moved away from the herd and is subjected to a sound (105) to prompt it to rejoin its peers. If the animal continues to ignore the audio warning, the counter will increase to a point (518) that electrical stimulation will be generated (523) and the animal (103) will receive an electric shock (106). If the animal receives several shocks and has still not rejoined the herd, a shock counter (522) will overflow to prevent any future shocks (521). This safety feature will prevent excessive trauma to an animal that is confused by the stimulation or is physically prevented from rejoining its peers. Once the animal has rejoined the herd, both the audio warning counter and the shock counter will be reset (512 and 514) to allow subsequent stimulation.

Controlling the Direction of Herd Movement—

Figure 2:
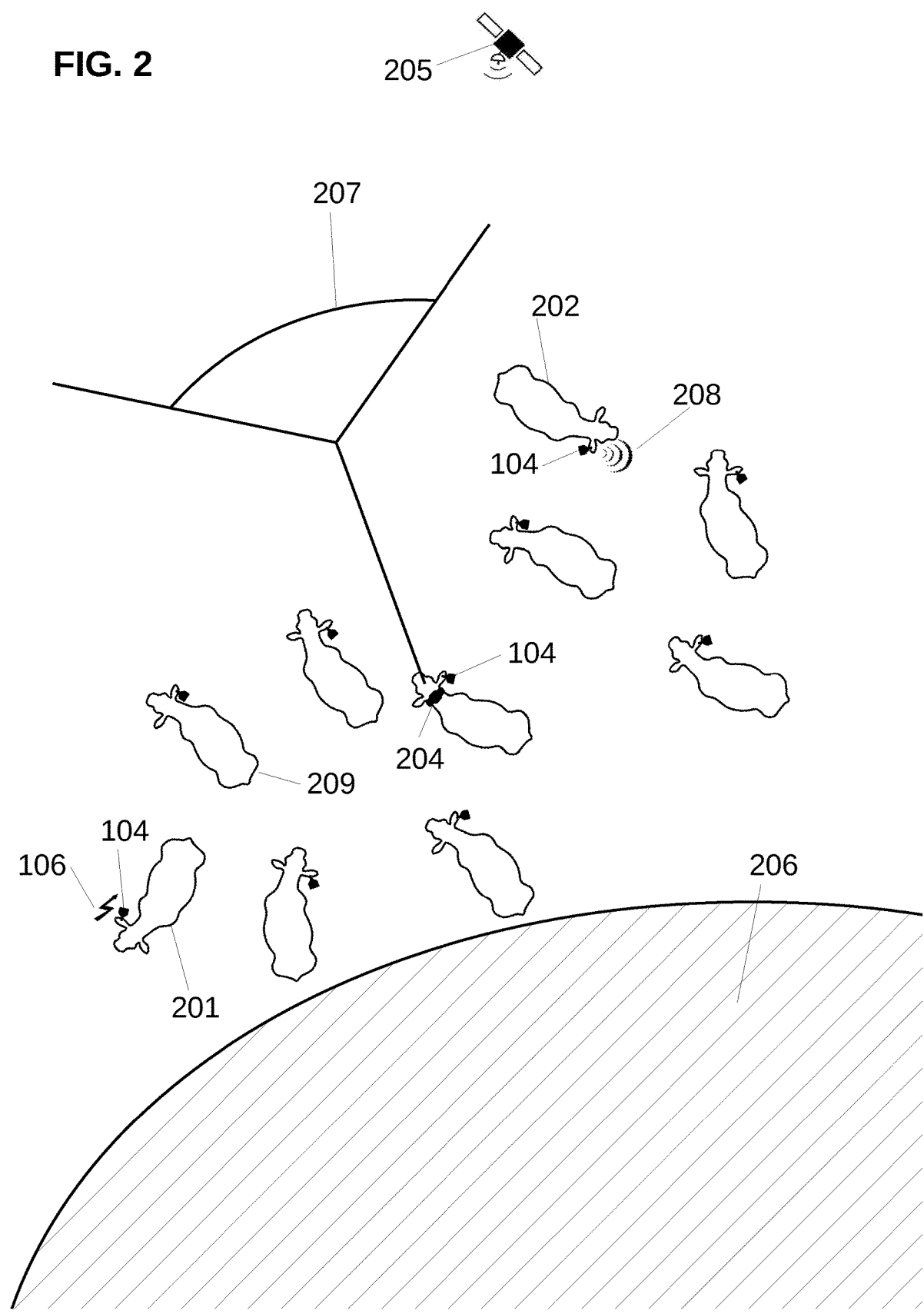
FIG. 2 shows animals in various directional orientations relative to the acceptable direction of movement and the function of the herding devices to keep the animals moving in an acceptable direction.

If a tracking device (204) is used in conjunction with the herding devices (104) the animals can be prompted to move in a desirable direction as illustrated by FIGS. 2 & 5. After determining (511) that the target animal is close enough to the herd the herding device will compare (513) the compass (405) heading with the acceptable headings (207) calculated by the tracking device (204). If an animal such as the one illustrated by (209) is headed in an acceptable direction no stimulation will be given. However, if the animal's heading is outside the acceptable range, a sound (208) will be generated as a warning. The compass heading will be checked repeatedly during the audio warning (516) to see if the animal (202) has corrected its direction of movement. If the animal fails to heed the audio warning, a time out (515) will occur after which a brief electrical shock (106) will be applied. FIG. 2 shows an animal (201) receiving an electric shock after failing to correct its heading in response to an audio warning. The audio warning (105) for stimulating the animal to rejoin the herd can be made distinguishable in pitch or other quality from that (208) signaling a need to change direction. This will allow the animal to learn the appropriate action for the two different sounds.

Tracking Device Firmware—

Figure 8:
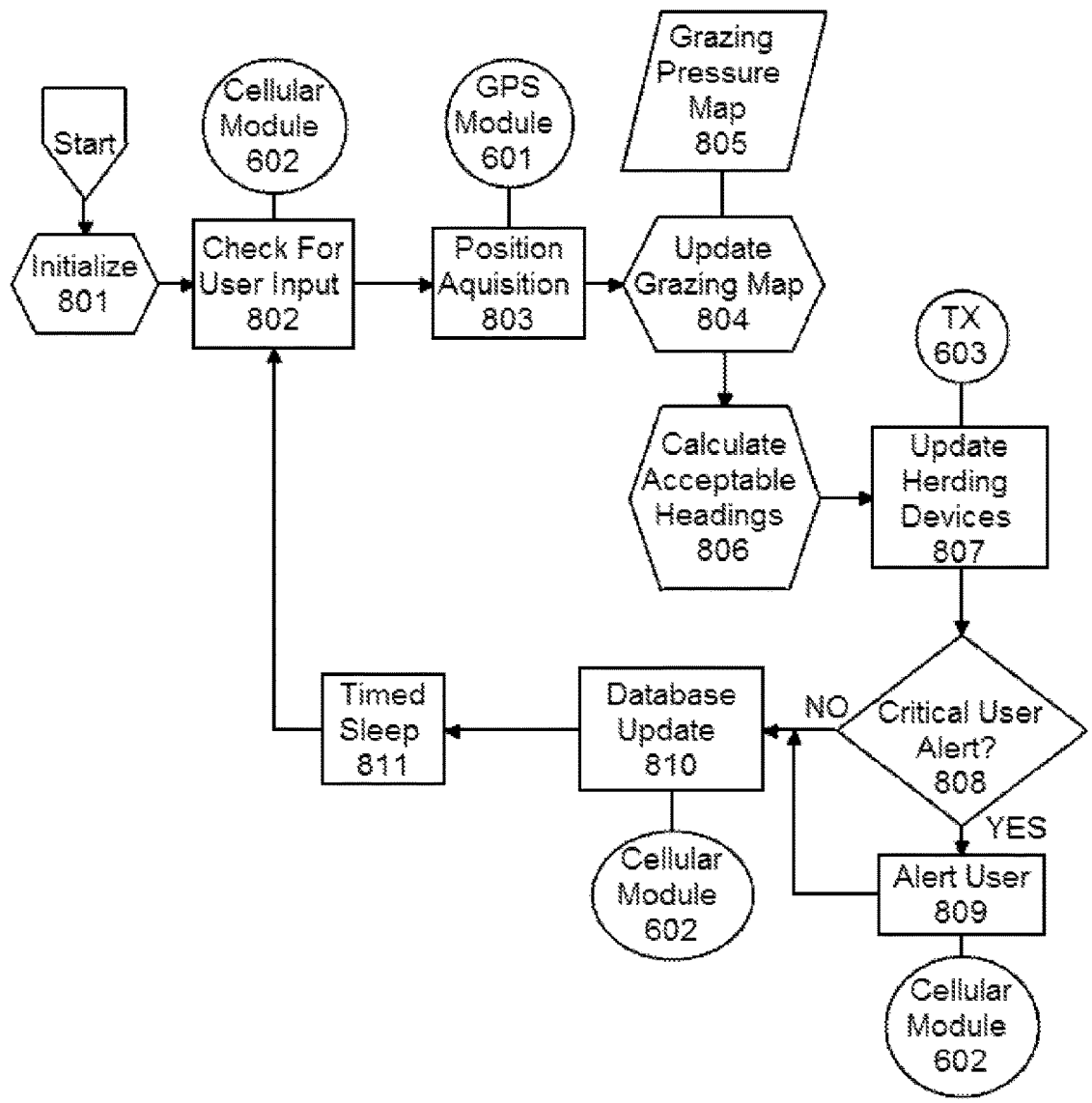
FIG. 8 shows a flowchart of a non-limiting program for the tracking device.

FIG. 8 shows a non-limiting flowchart for the tracking device firmware. Once initialized (801) the tracking device (204) can check for user input (802) by utilizing the cellular module (602) to retrieve SMS or online data. It will then acquire its geographic position (803) using the GPS module (601) and the GPS satellites (205). This location information will be utilized to update (804) the grazing pressure map (805). The tracking device will then use the grazing pressure map (805) to calculate (806) a range of acceptable animal headings (207) to avoid over or under grazing a given area. FIG. 2 shows an area (206) that has received enough grazing pressure such that the tracking device (204) chooses a range of acceptable headings (207) to move the herd to new grazing territory. The tracking device will then update (807) the herding devices (104) with the acceptable range of headings (207) by using its RF transceiver (603). As previously described, the herding devices (104) will utilize this information to direct their respective animals in the acceptable direction. The tracking device can also participate in many user interface functions. If a problem is detected (808) the device can alert the user to problems with the system (809). The user can also be updated with grazing information (810). After performing the appropriate functions, the tracking device can enter a timed power saving mode (811).

Controlling the Direction of Herd Movement—

If a tracking device (204) is used in conjunction with the herding devices (104) the animals can be prompted to move in a desirable direction as illustrated by FIGS. 2 & 5. After determining (511) that the target animal is close enough to the herd, and after resetting the warning counter (512), the herding device will compare (513) the compass (405) heading with the acceptable headings (207) calculated by the tracking device (204). If an animal such as the one illustrated by (209) is headed in an acceptable direction no stimulation will be given. However, if the animal's heading is outside the acceptable range, a sound (208) will be generated as a warning. The compass heading will be checked repeatedly during the audio warning (516) to see if the animal (202) has corrected its direction of movement. If the animal fails to heed the audio warning, a time out (515) will occur after which a brief electrical shock (106) will be applied. FIG. 2 shows an animal (201) receiving an electric shock after failing to correct its heading in response to an audio warning. The audio warning (105) for stimulating the animal to rejoin the herd can be made distinguishable in pitch or other quality from that (208) signaling a need to change direction. This will allow the animal to learn the appropriate action for the two different sounds.

Herd Maintenance Training—

After all the devices are appropriately attached to the target animals, a period of training can be implemented to ensure that the animals learn the appropriate response to the stimuli. In order to accomplish this training, herdsmen can take the animals to open pasture with the system still in its dormant state. After achieving a compact herd configuration, a user remote control device (706) and or application (701) can be used to bring the system to its herd maintenance state. In this state the herding devices (104) will give stimulation to animals which attempt to leave the herd as shown in FIG. 1. The herdsmen can then move back a little distance from the herd to give the animals freedom of movement. As individual animals stray from the herd they will receive stimulation. As the herdsmen ensure that stimulated animals rejoin the herd, the animals will quickly learn to stay together. The herdsmen should remain with the herd until they can ascertain that the animals no longer need their presence to respond correctly to the stimulation.

Directional Control Training—

A similar procedure can be used to train the animals to respond correctly to the directional stimulation from the system. After the animals have learned to respond correctly to the herd maintenance stimulation the system can be configured for a herd maintenance and directional control state. In this state the system will not only keep the animals together as a herd, but will also control their direction of movement based on the grazing pressure map (805) or user configuration. After using a user control device or application (701) to configure a desired direction of movement the herdsmen can move to the rear of the herd and give the animals enough space to have freedom of movement. As individual animals receive stimulation for traveling in the wrong direction, the herdsmen can position themselves to ensure that the stimulated animals return to the correct directional orientation. After a period of time, the herdsmen will no longer be necessary to ensure proper response to the directional stimulation.

Standard Operation—

After training is complete, the herd of animals will stay together to achieve the previously mentioned benefits. The user can monitor the location of the herd through the user application (701) and initiate control and configuration commands. The grazing pressure map accessible though the user application (701) can provide helpful information for grazing management purposes. The user application (701) can track the location of the herd and graph the amount of time the herd has grazed with respect to geographic location. This information will allow the user to make management decisions based on whether areas have been grazed heavily or not. If a particular animal's herding device (104) is lost or malfunctions it is likely that it will continue to stay with the herd because of peer pressure. The system can be put into a dormant state for birthing season to allow for the natural independence desired during labor. It is likely that the main body of the herd will continue to stay together during this time out of habit and preference.

Figure 9:
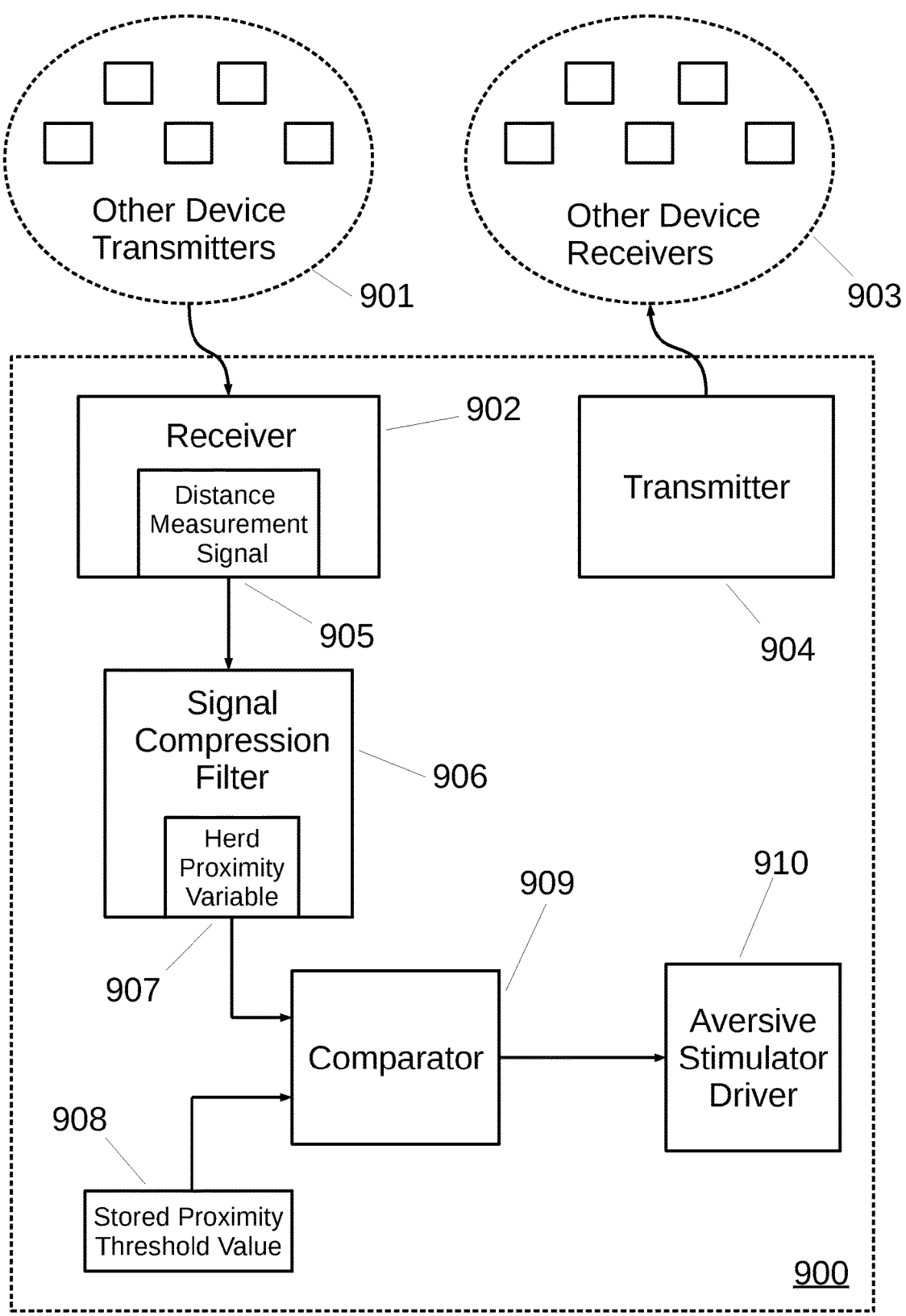
FIG. 9 is a schematic functional block diagram illustrating the basic function of the herding device of the present invention to cause grazing animals to stay together in a herd.

Reference is finally made to FIG. 9 which, in contrast to the above detail regarding one or more specific preferred embodiments, provides a diagram of the core functions of the present invention that are fundamental to each of the embodiments. FIG. 9 has been provided to illustrate the basic function of the herding device to cause grazing animals to stay together in a herd. As disclosed above, each specific herding device (900) attached to a grazing animal within the herd, will contain a transmitter (904) which will broadcast a device report signal to be received by other device receivers (903). Each specific herding device (900)

will also contain a receiver (902) to receive the report signals from other device transmitters (901) and to generate digital or analog distance measurement signals (905) based on RSS, time of flight, or other techniques described in the art. The distance measurement signal (905) stream generated by the reception of report signals from multiple other device transmitters (901) will be passed to a signal compression filter (906) which will output a digital or analog herd proximity variable (907). The signal compression filter (906) will at least comprise an analog or digital low pass filter or its digital signal processing routine equivalent, as in the embodiment described in detail above. A digital or analog comparator (909) will receive the herd proximity variable (907) and compare it with a stored proximity threshold value (908). The comparator (909) will output true or false depending on whether the animal carrying the specific herding device is in close enough proximity to its peers as defined by the signal compression filter properties and the user defined proximity threshold value (908). The comparator (909) output will control an aversive stimulator driver (910) which will effect audio, vibration or shock stimuli to be applied the animal which carries the specific herding device if it strays to far from its peers. In this way the entire herd of grazing animals fitted with such herding devices will be encouraged to stay together to avoid aversive stimulation.

Alternative Embodiments

Many variations from the illustrated embodiment could be implemented without deviating from the spirit and scope of the described method and system. As previously mentioned, the herding device (104) could be designed as an ear tag, neck collar, implant, etc. It could also use many different methods of measuring the distance between devices. RF or ultrasonic time of flight, received signal strength or phase shift are among the many possible options for distance measurement. Analog or digital components and methods could be used for the signal filter and the variable comparator. Many other kinds of sensors could be added to the herding device for additional functionality. For example accelerometers could be added for movement or behavior monitoring. The tracking device could utilize different methods of attachment and could even be incorporated into at least one of the herding device for a simpler system. Instead of utilizing a grazing pressure map for determining acceptable directions of herd movement, the user could create a series of waypoints to manage grazing and direct the herd to desired areas. Different ways of providing user control could also be implemented. A dedicated short range user control device could communicate using an RF transceiver compatible with that incorporated in the herding and or tracking devices. Alternatively, the cellular network (705) and a user application (701) could be utilized to provide control using a desktop computer or mobile device (704).

Although the present invention has been described in terms of the foregoing preferred embodiments, this description has been provided by way of explanation only, and is not intended to be construed as a limitation of the invention. Those skilled in the art will recognize modifications to the systems and methods of the present invention that might accommodate specific animals or specific rangeland environments. Such modifications as to structure, method, and even the specific arrangement of components, where such modifications are coincidental to the animal grazing environment or the specific animal being managed, do not necessarily depart from the spirit and scope of the invention.

I claim:
1. A system for managing a herd of grazing animals, the system comprising:
a plurality of herding devices, each herding device removably attached to one grazing animal in the herd, each herding device comprising:
a power supply;
an electromagnetic signal transmitter;
an electromagnetic signal receiver;
an electronic distance measurement signal filter;
an electronic variable comparator; and
an animal aversive stimulator;
wherein the electromagnetic signal transmitter is broadcasting an animal report signal;
the electromagnetic signal receiver is receiving animal report signals from herding devices associated with peer animals in the herd and output one or more distance measurement signals, the electronic distance measurement signal filter is converting the one or more distance measurement signals into a herd proximity value;
the electronic variable comparator is comparing the herd proximity value with a threshold value and generate a herd proximity pass/fail state; and
the animal aversive stimulator is generating an aversive stimulation to an animal upon a herd proximity fail state.
2. The system of claim 1 wherein the electronic distance measurement signal filter and electronic variable comparator comprise elements within an electronic data processor, the data processor programmed with signal and data processing routines comprising:
an animal report broadcast process routine;
an animal report polling process routine;
a peer proximity determination process routine; and
an aversive stimulator activation process routine.
3. The system of claim 1 wherein the animal aversive stimulator comprises an audio transducer.
4. The system of claim 1 wherein the animal aversive stimulator comprises an electrical shock generator.
5. The system of claim 2 wherein the animal aversive stimulator comprises an audio transducer and an electrical shock generator, and wherein the aversive stimulator activation process routine within the electronic data processor is alternately and time sequentially producing an aversive audio stimulation and an aversive electrical shock.
6. The system of claim 1 wherein the electromagnetic signal transmitter comprises a radio frequency (RF) transmitter and the electromagnetic signal receiver comprises a radio frequency (RF) receiver.
7. The system of claim 1 wherein the power supply comprises a battery.
8. The system of claim 7 wherein the battery is a rechargeable battery and the power supply further comprises a solar cell recharging the battery.
9. The system of claim 2 wherein each herding device further comprises an electronic compass and the electronic data processor of each herding device is further programmed with an animal orientation process routine, wherein the animal orientation process routine in combination with the electronic compass, is testing animal orientation, and in combination with the animal aversive stimulator and the aversive stimulator activation process routine, is generating an aversive stimulation to an animal upon failure of the animal orientation test.
10. The system of claim 9 further comprising at least one tracking device, the at least one tracking device removably attached to at least one tracked grazing animal in the herd, the at least one tracking device comprising: a power supply; a GPS device; at least one electromagnetic signal transmitter; at least one electromagnetic signal receiver; and an electronic data processor, the data processor programmed with signal and data processing routines comprising: a position acquisition process routine; a grazing map database and map update process routine; an acceptable heading calculation process routine; and an acceptable heading broadcast process routine; wherein the GPS device in combination with the electronic data processor is acquiring position data for the at least one tracked grazing animal, the grazing map database and map update process routine of the electronic data processor are identifying a position of the at least one tracked grazing animal within the grazing map database, the acceptable heading calculation process routine in combination with the grazing map database is calculating acceptable compass headings for the animals in the herd, and the at least one electromagnetic signal transmitter in combination with the electronic data processor is transmitting acceptable compass headings to the plurality of herding devices.

11. The system of claim 10 wherein the at least one electromagnetic signal transmitter and the at least one electromagnetic signal receiver comprise:
 a first transmitter and a first receiver for signal communication with the plurality of herding devices; and
 a second transmitter and a second receiver for signal communication with one or more remote user data input/output devices; and
 wherein the electronic data processor is further programmed with a user communication process routine.

12. The system of claim 10 wherein the power supply, the at least one electromagnetic signal transmitter, the at least one electromagnetic signal receiver, and the electronic data processor of the at least one tracking device, are incorporated into the corresponding power supply, electromagnetic signal transmitter, electronic signal receiver, and electronic data processor of at least one of the plurality of herding devices.

13. A method for managing a herd of grazing animals comprising the steps of:
 providing a plurality of herding devices removably attached to grazing animals in the herd, each herding device comprising: a power supply; an electromagnetic signal transmitter; an electromagnetic signal receiver; an electronic distance measurement signal filter, an electronic variable comparator; and an animal aversive stimulator;
 each herding device broadcasting (reporting) an animal report signal;
 each herding device receiving animal report signals from herding devices on other animals in the herd;
 each herding device determining a spacing distance between itself and every other reporting herding device based upon received animal report signals;
 each herding device comparing the determined spacing distance with a preset maximum spacing distance;
 each herding device identifying a non-compliance condition upon the determined spacing distance exceeding the preset maximum spacing distance; and
 each herding device, on a non-compliance condition, activating the animal aversive stimulator.

14. The method of claim 13 wherein the steps of each herding device determining and comparing the spacing distance, further comprise the steps of:
 each herding device counting a number of determined spacing distances within the preset maximum spacing distance to establish a peer count; and
 each herding device comparing the established peer count with a minimum peer count;
 and the step of each herding device identifying a non-compliance condition comprises identifying a non-compliance condition upon the established peer count having a value less than the minimum peer count.

15. The method of claim 13 wherein:
 each herding device further comprises an electronic counter;
 the animal aversive stimulator comprises an audio transducer and an electrical shock generator;
 the step of activating the animal aversive stimulator comprises activating the audio transducer; and
 the method further comprising the steps of:
 each herding device counting a number of non-compliance conditions occurring within a preset time period to establish a warning count;
 each herding device comparing the warning count with a preset maximum warning count;
 each herding device identifying a shock condition upon the established warning count having a value greater than the maximum warning count; and
 each herding device, on a shock condition, activating the electrical shock generator.

16. The method of claim 13 wherein:
 each herding device further comprises an electronic compass;
 the method further comprising the steps of:
 each herding device measuring a compass heading;
 each herding device comparing a measured compass heading with a stored acceptable compass heading;
 each herding device identifying a non-compliance condition upon the measured compass heading differing from the stored acceptable compass heading by more than a preset value; and
 each herding device, on a non-compliance condition, activating the animal aversive stimulator.

17. The method of claim 16 wherein:
 the animal aversive stimulator comprises an audio transducer and an electrical shock generator;
 the step of activating the animal aversive stimulator comprises activating the audio transducer; and
 the method further comprising the steps of:
 each herding device counting a number of non-compliance conditions occurring within a preset time period to establish a warning count;
 each herding device comparing the warning count with a preset maximum warning count;
 each herding device identifying a shock condition upon the established warning count having a value greater than the maximum warning count; and
 each herding device, on a shock condition, activating the electrical shock generator.

18. The method of claim 16 further comprising the steps of:
 providing at least one tracking device removably attached to at least one tracked grazing animal in the herd, the at least one tracking device comprising: a power supply; a GPS device; at least one electromagnetic signal transmitter; at least one electromagnetic signal receiver; and an electronic data processor with a grazing map database;

the at least one tracking device establishing a geographic position of the at least one tracked grazing animal from the GPS device;

the at least one tracking device identifying the geographic position on the grazing map database and updating the grazing map database with the geographic position;

the at least one tracking device calculating an acceptable compass heading from the identified geographic position and the grazing map database;

the at least one tracking device transmitting the acceptable compass heading to each of the plurality of herding devices; and each herding device receiving and storing the acceptable compass heading.

19. The method of claim 18 wherein:

the at least one electromagnetic signal transmitter and the at least one electromagnetic receiver of the at least one tracking device comprise first and second transmitters and first and second receivers;

the step of the at least one tracking device transmitting the acceptable compass heading to each of the plurality of herding devices comprises transmitting an RF signal from the first transmitter; and the method further comprising the steps of:

providing one or more remote user data input/output devices;

the at least one tracking device transmitting the geographic position of the at least one tracked grazing animal from the GPS device to the one or more remote user data input/output devices from the second transmitter; and the at least one tracking device receiving updated grazing map database data from the one or more remote user data input/output devices.

20. The method of claim 16 further comprising the steps of:

providing at least one tracking device removably attached to at least one tracked grazing animal in the herd, the at least one tracking device comprising: a power supply; a GPS device; at least one electromagnetic signal transmitter; at least one electromagnetic signal receiver; and an electronic data processor;

providing one or more remote user data input/output devices;

the at least one tracking device establishing a geographic position of the at least one tracked grazing animal from the GPS device;

the at least one tracking device transmitting the geographic position of the at least one tracked grazing animal to the one or more remote user data input/output devices;

the at least one tracking device receiving an acceptable compass heading from the one or more remote user data input/output devices;

the at least one tracking device transmitting the acceptable compass heading to each of the plurality of herding devices; and each herding device receiving and storing the acceptable compass heading.

* * * * *